(69.)
JUNIUS JUDSON.
Steam Governor.
No. 4,655. Reissued Dec. 5, 1871.
Fig. 1.
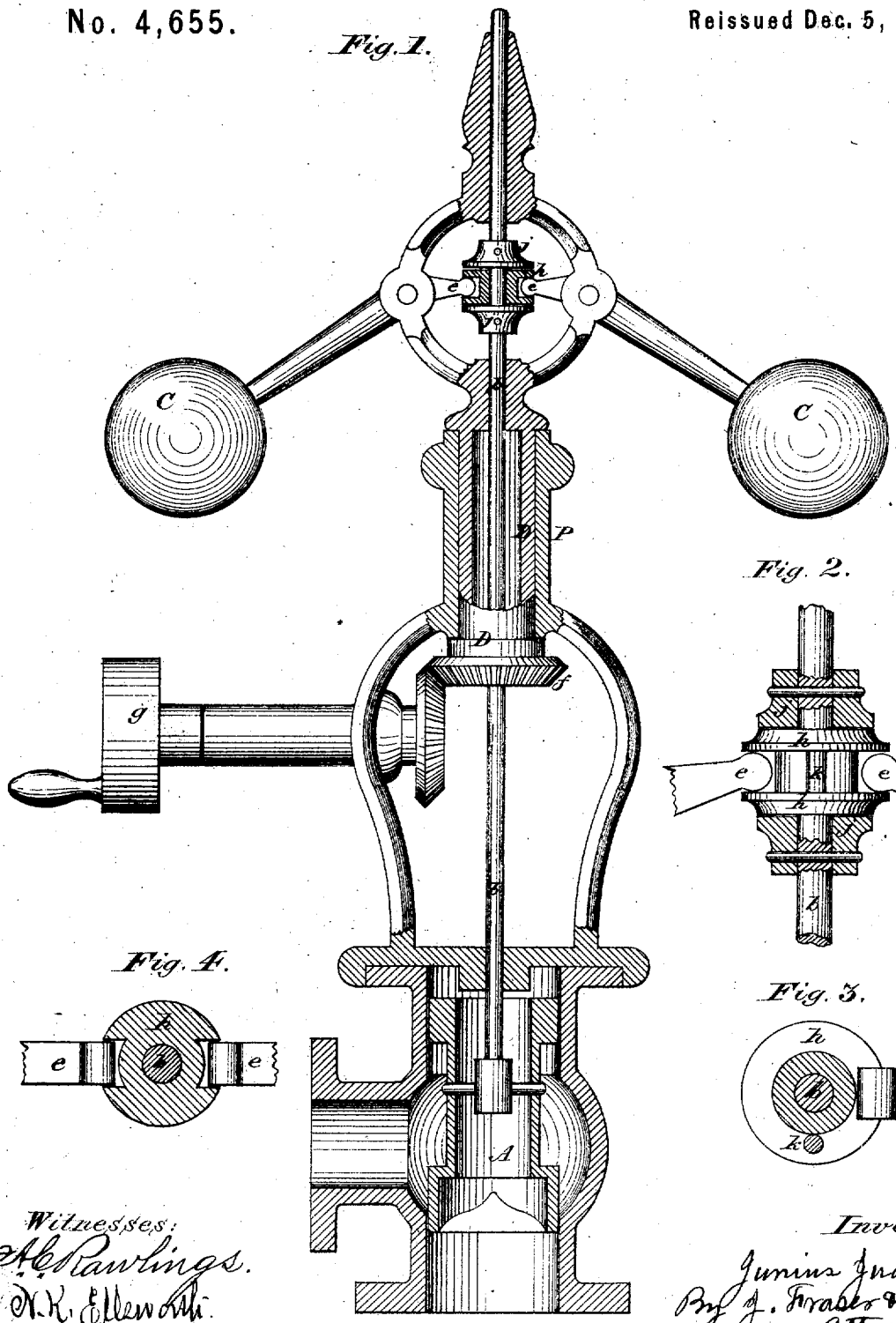
Fig. 2.
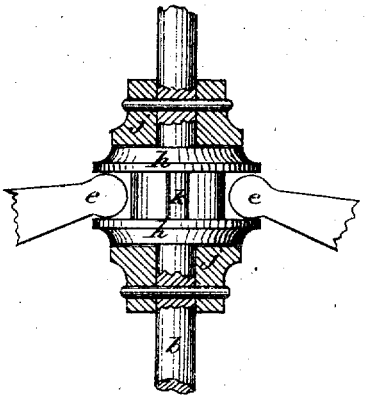
Fig. 4.
Fig. 3.
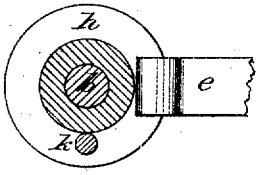
Witnesses:
A. C. Rawlings.
N. K. Ellenwood.
Inventor:
Junius Judson
By J. Fraser & Co.
attys
Rochester
N. Y.
AM. PHOTO-LITHOGRAPHIC CO. N.Y. (OSBORNE'S PROCESS.)

UNITED STATES PATENT OFFICE.

JUNIUS JUDSON, OF ROCHESTER, NEW YORK.

IMPROVEMENT IN GOVERNORS FOR STEAM-ENGINES.

Specification forming part of Letters Patent No. 33,743, dated November 19, 1861; reissue No. 4,655, dated December 5, 1871.

*To all whom it may concern:*

Be it known that I, JUNIUS JUDSON, of Rochester, in the county of Monroe and State of New York, have invented a new and useful Improvement in the Governors of Steam-Engines; and I do hereby declare that the following is a specification thereof.

This invention consists in combining with the governor-balls and with a spindle or rod connected directly with the valve, a swivel-collar, by which much friction is saved and the construction greatly simplified.

In the drawing, Figure 1 is an elevation of a governor constructed after my improved method, parts thereof being shown in section; Fig. 2, an enlarged view of the upper portion of the same; Fig. 3, a horizontal section of Fig. 2; Fig. 4, a modified form of the parts shown in Figs. 2 and 3.

A represents the valve, and *b* the rod or spindle rising directly therefrom and connecting with the governor-balls C C. The rod passes through the hollow sleeve or shaft D, which in turn rests in the hollow bearing P, as clearly shown. The sleeve D has at its lower end a miter-gear, *f*, which connects with a corresponding pinion on the shaft of the band-pulley *g*, from which rotary motion is imparted to the balls. I provide a loose or swivel-collar, *h*, upon the rod *b*, having an annular groove in its periphery which receives the short ends of the arms *e e* of the governor-balls, which ends are made of a circular or rounded form at their extremities in order to turn easily in the groove as the balls rise or fall under the influence of their motion. Stationary or clutch collars *j j* are placed, respectively, above and below the swivel-collar *h* and held by pins or other fastenings securely to the rod. This insures to the rod the only motion that is required to work the valve A—that is, the rising and falling of the same in obedience to the action of the governor-balls—while the collar *h*, the medium for communicating that action, revolves on the rod with the balls. From the small extent of its surface subject to friction, namely, that in contact with the rod and the stationary collars, the loss from that cause and from the wearing of the parts is very trifling. I also by this construction avoid all jointing of the rods and connection of lever-work, which is used in other arrangements, as the connection between the governor-balls and the valve. In my invention a single straight rod forms the connection between the balls and the valve through the intervention of the swiveled collar, and in this simple and direct connection lies the chief merit of my invention.

To make the engagements between the governor-arms and the sleeve and prevent the latter remaining stationary a pin, *k'*, may be placed across the groove, as in Figs. 2 and 3; or the ends of the arms *e e* may be set in sockets of the collar, as in Fig. 4; or any equivalent connection may be made. The fitting of the hollow sleeve D in the socket-bearing P is also peculiar to my arrangement. This hollow sleeve allows the rod to play up and down freely, while at the same time the sleeve has a firm support to sustain the balls as it revolves.

What I claim, and desire to secure by Letters Patent, is—

The combination of the swivel-collar *h* with the governor-balls C C, and with the rod *b* connecting said balls directly with the valve, as herein described.

JUNIUS JUDSON.

Witnesses:
R. F. OSGOOD,
J. P. BARNES.

(69)